United States Patent

Wang et al.

(10) Patent No.: US 10,788,618 B2
(45) Date of Patent: Sep. 29, 2020

(54) BACKLIGHT MODULE AS WELL AS DISPLAY PANEL AND ELECTRONIC DEVICE COMPRISING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xuerong Wang, Beijing (CN); Caizheng Zhang, Beijing (CN); Junjie Ma, Beijing (CN); Jianan Wang, Beijing (CN); Qingping Yin, Beijing (CN); Lu Yu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 419 days.

(21) Appl. No.: 15/768,208

(22) PCT Filed: Sep. 21, 2017

(86) PCT No.: PCT/CN2017/102559
§ 371 (c)(1),
(2) Date: Apr. 13, 2018

(87) PCT Pub. No.: WO2018/133436
PCT Pub. Date: Jul. 26, 2018

(65) Prior Publication Data
US 2020/0241194 A1 Jul. 30, 2020

(30) Foreign Application Priority Data

Jan. 17, 2017 (CN) .......................... 2017 1 0031862

(51) Int. Cl.
*F21V 8/00* (2006.01)
*G02F 1/13357* (2006.01)

(52) U.S. Cl.
CPC ......... *G02B 6/0065* (2013.01); *G02B 6/0043* (2013.01); *G02B 6/0051* (2013.01);
(Continued)

(58) Field of Classification Search
CPC ......... G02F 1/133504; G02F 1/133602; G02F 1/133605; G02F 2001/133607;
(Continued)

(56) References Cited

U.S. PATENT DOCUMENTS

2005/0105014 A1* 5/2005 Hong .................... G02B 6/005
349/65
2009/0167986 A1* 7/2009 Lee .................... G02F 1/133606
349/64
(Continued)

FOREIGN PATENT DOCUMENTS

| CN | 201464763 U | 5/2010 |
| CN | 102073092 A | 5/2011 |

(Continued)

OTHER PUBLICATIONS

First Office Action for Chinese Patent Application No. 201710031862.4 dated Mar. 1, 2019.
(Continued)

*Primary Examiner* — Jessica M Merlin
(74) *Attorney, Agent, or Firm* — Calfee, Halter & Griswold LLP

(57) ABSTRACT

The present disclosure relates to a backlight module as well as a display panel and an electronic device comprising the same. The backlight module includes: a light guide plate; a first low refractive plating layer; a diffusion plating layer; a high refractive plating layer; a second low refractive plating
(Continued)

layer; a Bragg reflective plating layer; and a light source. Further, in the backlight module, refractive indexes of the first low refractive plating layer and the second low refractive plating layer are lower than that of the light guide plate, and a refractive index of the high refractive plating layer is higher than that of the light guide plate.

19 Claims, 4 Drawing Sheets

(52) U.S. Cl.
CPC ..... G02B 6/0055 (2013.01); G02F 1/133606 (2013.01); *G02F 2201/307* (2013.01)

(58) Field of Classification Search
CPC ............ G02F 2201/307; G02B 6/0043; G02B 6/0051; G02B 6/0065; G02B 6/0055

See application file for complete search history.

(56) References Cited

U.S. PATENT DOCUMENTS

| | | | |
|---|---|---|---|
| 2011/0176089 | A1 | 7/2011 | Ishikawa et al. |
| 2013/0121021 | A1 | 5/2013 | Lin et al. |
| 2015/0062493 | A1 | 3/2015 | Yoon et al. |
| 2018/0011353 | A1* | 1/2018 | Wang ................ G02F 1/133308 |

FOREIGN PATENT DOCUMENTS

| | | |
|---|---|---|
| CN | 102128388 A | 7/2011 |
| CN | 102519010 A | 6/2012 |
| CN | 104423089 A | 3/2015 |
| CN | 104712958 A | 6/2015 |
| CN | 104791662 A | 7/2015 |
| CN | 106154398 A | 11/2016 |
| CN | 106707621 A | 5/2017 |
| JP | 2005134441 A | 5/2005 |
| KR | 20110064854 A | 6/2011 |

OTHER PUBLICATIONS

Search Report for International Application No. PCT/CN2017/102559 dated Dec. 28, 2017.

* cited by examiner

BACKLIGHT MODULE AS WELL AS DISPLAY PANEL AND ELECTRONIC DEVICE COMPRISING THE SAME

REFERENCE TO RELATED APPLICATION(S)

The present application is the U.S. national phase entry of PCT/CN2017/102559 filed on Sep. 21, 2017, which claims the priority of the Chinese patent application No. 201710031862.4 filed on Jan. 17, 2017, the entire disclosures of both are incorporated herein by reference.

TECHNICAL FIELD

The present disclosure relates to the field of display technologies, and in particular to a backlight module, as well as a display panel and an electronic device comprising the same.

BACKGROUND ART

A backlight module is one of the key components for a liquid crystal display panel. Typically, the backlight module functions so as to provide light outputs with sufficient luminance and uniform distribution, such that a normal display of images is enabled.

SUMMARY

The present disclosure aims to at least solve one of the technical problems in the relevant art to some degree. To this end, it is an objective of the present disclosure to provide a backlight module with a simple structure and an easy manufacturing process, which facilitates improvement of image quality, product yield or the like of a liquid crystal display panel.

According to one aspect of the present disclosure, a backlight module is provided. According to a specific embodiment, the backlight module comprises: a light guide plate, the light guide plate comprising a first surface and a second surface opposite to each other; a first low refractive plating layer, the first low refractive plating layer being arranged on the first surface of the light guide plate; a diffusion plating layer, the diffusion plating layer being arranged on a surface of the first low refractive plating layer away from the light guide plate; a high refractive plating layer, the high refractive plating layer being arranged on a surface of the diffusion plating layer away from the light guide plate; a Bragg reflective plating layer, the Bragg reflective plating layer being arranged on the second surface of the light guide plate; and a light source, the light source being arranged at a light incident side of the light guide plate. Furthermore, in the above proposed backlight module, the refractive index of the first low refractive plating layer is lower than that of the light guide plate, and the refractive index of the high refractive plating layer is higher than that of the light guide plate.

According to an embodiment of the present disclosure, the backlight module further comprises: a second low refractive plating layer, the second low refractive plating layer being arranged between the light guide plate and the Bragg reflective plating layer, wherein the refractive index of the second low refractive plating layer is also lower than that of the light guide plate.

According to an embodiment of the present disclosure, in the backlight module, the first low refractive plating layer and the second low refractive plating layer are formed of a fluoride respectively, wherein the fluoride comprises at least one of calcium fluoride and magnesium fluoride.

According to an embodiment of the present disclosure, in the backlight module, the diffusion plating layer comprises diffusion particles, wherein the diffusion particles comprise at least one of acrylic acid and organic silicon.

According to an embodiment of the present disclosure, in the backlight module, the high refractive plating layer further comprises: a plurality of high refractive sub-plating layers, wherein the refractive indexes of the plurality of high refractive sub-plating layers increase gradually in a direction away from the light guide plate.

According to an embodiment of the present disclosure, in the backlight module, none of the refractive indexes of the plurality of high refractive sub-plating layers is lower than 1.56.

According to an embodiment of the present disclosure, in the backlight module, the plurality of high refractive sub-plating layers are formed of optical glue respectively.

According to an embodiment of the present disclosure, in the backlight module, the Bragg reflective plating layer comprises silicon dioxide layers and titanium dioxide layers stacked alternately.

According to an embodiment of the present disclosure, in the backlight module, the first surface of the light guide plate is provided with concave-dot light guide patterns.

According to another aspect of the present disclosure, a display panel is further provided. According to a specific embodiment, the display panel comprises the backlight module described in any of the above embodiments.

According to yet another aspect of the present disclosure, an electronic device is further provided. According to a specific embodiment, the electronic device comprises the display panel described in any of the above embodiments. One skilled in the art can understand that the electronic device has all features and advantages of the display panel, which will not be repeated herein for simplicity.

DETAILED DESCRIPTION OF THE EMBODIMENTS

Embodiments of the present disclosure will be described below in detail. The embodiments as described below are exemplary, and they are only used for explaining the present disclosure, rather than limiting the present disclosure. For specific techniques or conditions not specified in the embodiments, one skilled in the art should easily understand that they can be carried out according to any techniques or conditions described in documents of the art or according to a product specification. In embodiments, agents or instruments without designated manufactures are all conventional products that are commercially available.

Figure 1:
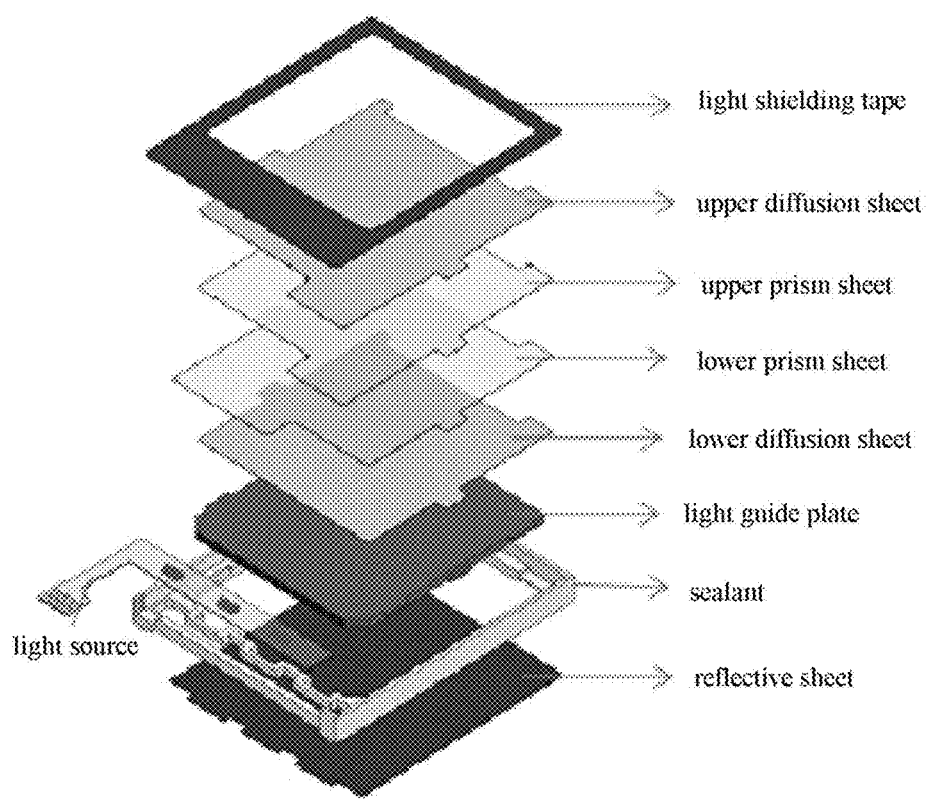
FIG. 1 shows a schematic structure view of a typical backlight module in the prior art.

As a typical example, with reference to FIG. 1, a conventional backlight module generally comprises: a light source, a light shielding tape, an upper diffusion sheet, an upper prism sheet, a lower prism sheet, a lower diffusion sheet, a light guide plate, a sealant, and a reflective sheet. As can be seen, the backlight module usually comprises a plurality of optical films, and hence has disadvantages such as a complicated structure, a large thickness, and a tedious manufacturing process. With more and more liquid crystal modules longing for thinness and light weight, the conventional backlight modules are required to be further improved.

Figure 2:
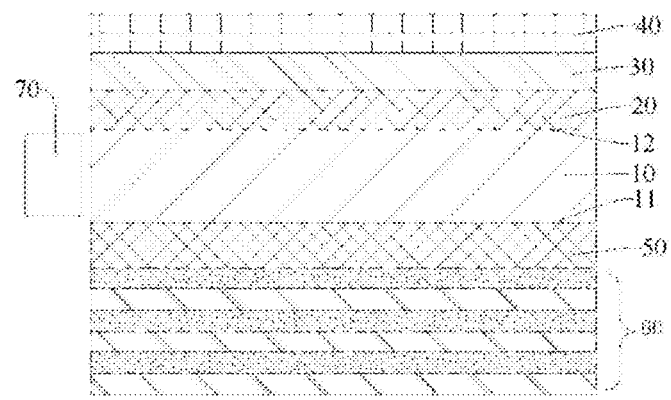
FIG. 2 shows a schematic structure view of a backlight module according to an embodiment of the present disclosure.

In one aspect of the present disclosure, a backlight module is provided. According to an embodiment of the present disclosure, with reference to FIG. 2, the backlight module comprises: a light guide plate 10, the light guide plate 10 comprising a first surface (an upper surface in FIG. 2) 12 and a second surface (a lower surface in FIG. 2) 11 opposite to each other; a first low refractive plating layer 20, the first low refractive plating layer 20 being arranged on the upper surface 12 of the light guide plate 10; a diffusion plating layer 30, the diffusion plating layer 30 being arranged on an upper surface (i.e., a surface away from the light guide plate 10) of the first low refractive plating layer 20; a high refractive plating layer 40, the high refractive plating layer 40 being arranged on an upper surface (i.e., a surface away from the light guide plate 10) of the diffusion plating layer 30; an optional second low refractive plating layer 50, the second low refractive plating layer 50 being arranged on the lower surface 11 of the light guide plate 10; a Bragg reflective plating layer 60, the Bragg reflective plating layer 60 being arranged on a lower surface (i.e., a surface away from the light guide plate 10) of the second low refractive plating layer 50; and a light source 70, the light source 70 being arranged at a light incident side of the light guide plate 10, particularly, on a side face of the light guide plate 10 in FIG. 2. According to an embodiment of the present disclosure, a backlight module with multi-layered plating films are obtained by performing processes such as evaporation and coating on a conventional optical material. In this way, on the premise that the same optical properties as those of a conventional backlight module are retained, complicated structures of a conventional module such as upper/lower prism sheets, sealants and light shielding tapes are avoided. This simplifies the structure of the backlight module greatly, improves the product yield, reduces the optical loss, and significantly promotes the luminance of the output light. In a specific embodiment, the thickness of the entire backlight module is only decided by the thicknesses of the light guide plate and the upper and lower plating layers. This enables realization of an ultra-thin display panel. Therefore, the conventional display modules are greatly promoted in terms of image quality, product yield and so on.

It should be noted that, in the backlight module as provided herein, "a low refractive plating layer" means that the refractive index of the plating layer is lower than that of the light guide plate, while "a high refractive plating layer" means that the refractive index of the plating layer is higher than that of the light guide plate. As can be seen, in the above mentioned backlight module, the refractive indexes of the first low refractive plating layer and the optional second low refractive plating layer are lower than the refractive index of the light guide plate, and the refractive index of the high refractive plating layer is higher than that of the light guide plate.

According to an embodiment of the present disclosure, there are no special limitations on the specific materials for forming the light guide plate, which can be selected flexibly by one skilled in the art upon actual needs. In some embodiments of the present disclosure, the light guide plate can be formed of one of polycarbonate and polymethacrylate. Therefore, the light guide plate has a higher production efficiency (e.g., it can be fabricated by injection or extrusion molding) and a relatively higher transmittance.

According to an embodiment of the present disclosure, there are no special limitations on materials for forming the first low refractive plating layer and the second low refractive plating layer, and one skilled in the art can select upon needs any suitable refractive index. In some embodiments of the present disclosure, the first low refractive plating layer and the second low refractive plating layer are independently formed of a fluoride. The fluoride has a refractive index of about 1.35, and can effectively substitute an air layer located on a bottom side of a conventional light guide plate pattern as well as between an upper surface (i.e., a light exit surface) of the light guide plate and the diffusion sheet. According to an embodiment of the present disclosure, there are no special limitations on specific types of fluoride. E.g., it comprises but is not limited to at least one of calcium fluoride and magnesium fluoride. Therefore, by means of a suitable refractive index, the backlight module can be further improved in use performance.

According to an embodiment of the present disclosure, the diffusion layer can diffuse light emitted from the light guide plate and provide uniform planar backlight for the display panel. In some embodiments of the present disclosure, the diffusion plating layer comprises diffusion particles, and the diffusion particles comprise at least one of acrylic acid and organic silicon. Therefore, the diffusion layer can achieve a good diffusion effect such that the light source is more uniform.

Figure 3:
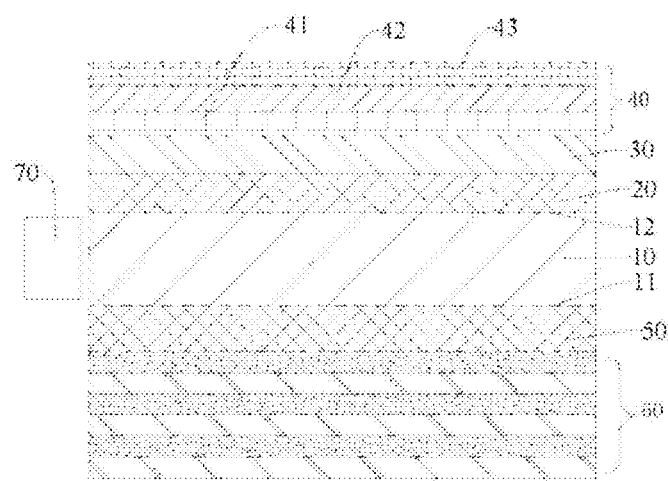
FIG. 3 shows a schematic structure view of a backlight module according to another embodiment of the present disclosure.

According to an embodiment of the present disclosure, with reference to FIG. 3, in the backlight module, the high refractive plating layer 40 can further comprise: a plurality of high refractive sub-plating layers 41, 42 and 43. Specifically, the refractive indexes of the plurality of high refractive sub-plating layers 41, 42 and 43 increase gradually in a direction away from the light guide plate 10. Therefore, with the high refractive plating layer 40, light can be converged towards the 90° direction, and the light output has the maximum light intensity in the 90° direction. One skilled in the art can understand that the number of high refractive sub-plating layers is not limited to three as shown in FIG. 3. Apparently, FIG. 3 only provides an optional structure for exemplifying the backlight module of the present disclosure, which should not be construed as limiting the present disclosure. In fact, the specific number of high refractive sub-plating layers can be flexibly adjusted upon actual needs.

According to an embodiment of the present disclosure, none of the refractive indexes of the plurality of high refractive sub-plating layers is lower than 1.56. As a result, the light convergence effect can be further improved, such that light is converged towards the 90° direction, and has the maximum light intensity in the 90° direction. In this way, the optical loss is effectively reduced, the light utilization and luminance are improved, and the backlight module is further enhanced in use effect.

According to an embodiment of the present disclosure, there are no special limitations on materials for forming the high refractive sub-plating layers, which can be selected flexibly by one skilled in the art upon actual needs. In some embodiments of the present disclosure, the plurality of high refractive sub-plating layers is formed of optical glue independently. Therefore, the backlight module has ideal optical performances and can be obtained from wide sources. This facilitates low pricing and easy fabrication.

According to an embodiment of the present disclosure, the Bragg reflective plating layer is a structure obtained by stacking alternately two materials with different refractive indexes in an ABAB . . . manner. According to an embodiment of the present disclosure, in the Bragg reflective plating layer, there are no special limitations on the thickness of each layer, which can be flexibly selected upon the reflection effect as actually needed and will not be repeated herein for simplicity. According to an embodiment of the present disclosure, there are no special limitations on the types of material for forming the Bragg reflective plating layer, as long as they have different refractive indexes and can achieve a nearly total reflection effect. In some embodiments of the present disclosure, the Bragg reflective plating layer comprises silicon dioxide layers and titanium dioxide layers stacked alternately. The refractive indices of $TiO_2$ and $SiO_2$ are respectively 2.38 and 1.46, and the two plating film materials are stacked alternately. In this manner, by means of the principle of interfering constructively or destructively, the reflectivity of a 20-layered plating layer formed by the two materials can be as high as 98%. This can facilitate total reflection of light on a lower side of the light guide plate, and replace a bottom reflective plate of the conventional backlight module. As can be seen, in the backlight module provided by the present disclosure, no bottom reflective material is needed any more. This helps to solve problems such as thin film reliability caused by bottom reflection in a conventional backlight module. According to an embodiment of the present disclosure, in the Bragg reflective plating layer, there are no special limitations on the thickness and number of the silicon dioxide layers and the titanium dioxide layers, which can be flexibly selected upon the reflectivity as actually needed. Besides, when the reflectivity of the Bragg reflective plating layer satisfies a certain requirement (of 95% or higher), the second low refractive plating layer can be even omitted. This means that the Bragg reflective plating layer can be formed directly on the lower surface of the light guide plate, without influencing the optical performance of the backlight module.

In a specific embodiment of the present disclosure, a plurality of plating layers are formed respectively on the upper surface and the lower surface of the light guide plate (PMMA) by performing processes such as evaporation and coating, thereby obtaining the backlight module as shown in FIG. 3. In particular, in the backlight module, the refractive index of the light guide plate is 1.49, the refractive indexes of the first low refractive plating layer and the second low refractive plating layer are respectively about 1.38, and the refractive indexes of the silicon dioxide layers and the titanium dioxide layers in the Bragg reflective layer are respectively 2.38 and 1.46. Besides, for the number of layers and the thickness of each layer in the silicon dioxide layers and the titanium dioxide layers, please see table 1 below. Specifically, table 1 shows, by two columns on the left and two columns on the right, the number of layers and the thickness of each layer in the Bragg reflective layer under two different conditions. Meanwhile, as a comparison, a comparison backlight module is further provided, wherein only a mono-layered reflective plating layer, and specifically a mono-layered silver plating layer or aluminum plating layer, instead of a Bragg reflective plating layer, is formed on the lower surface of the light guide plate.

TABLE 1 number of layers and thickness of each layer in a multi-layered plating film
thickness of a multi-layered plating film

| Item | thickness (nm) | Item | thickness (nm) |
| --- | --- | --- | --- |
| $TiO_2$ | 29.93 | $TiO_2$ | 89.83 |
| $SiO_2$ | 98.4 | $SiO_2$ | 54.64 |
| $TiO_2$ | 29.93 | $TiO_2$ | 89.83 |
| $SiO_2$ | 23.48 | $SiO_2$ | 54.64 |
| $TiO_2$ | 27.18 | $TiO_2$ | 89.83 |
| $SiO_2$ | 27.32 | $SiO_2$ | 54.64 |
| $TiO_2$ | 89.83 | $TiO_2$ | 89.83 |
| $SiO_2$ | 54.64 | $SiO_2$ | 54.64 |
| $TiO_2$ | 89.83 | $TiO_2$ | 89.83 |
| $SiO_2$ | 54.64 | $SiO_2$ | 27.32 |
| $TiO_2$ | 89.83 | $TiO_2$ | 22.7 |
| $SiO_2$ | 54.64 | $SiO_2$ | 74.62 |
| $TiO_2$ | 89.83 | $TiO_2$ | 22.7 |
| $SiO_2$ | 54.64 | $SiO_2$ | 30.17 |
| $TiO_2$ | 89.83 | $TiO_2$ | 99.2 |
| $SiO_2$ | 54.64 | $SiO_2$ | 30.17 |
| $TiO_2$ | 89.83 | $TiO_2$ | 18.9 |
| $SiO_2$ | 54.64 | $SiO_2$ | 62.14 |
| $TiO_2$ | 89.83 | $TiO_2$ | 18.9 |
| $SiO_2$ | 54.64 | | |

Figure 4:
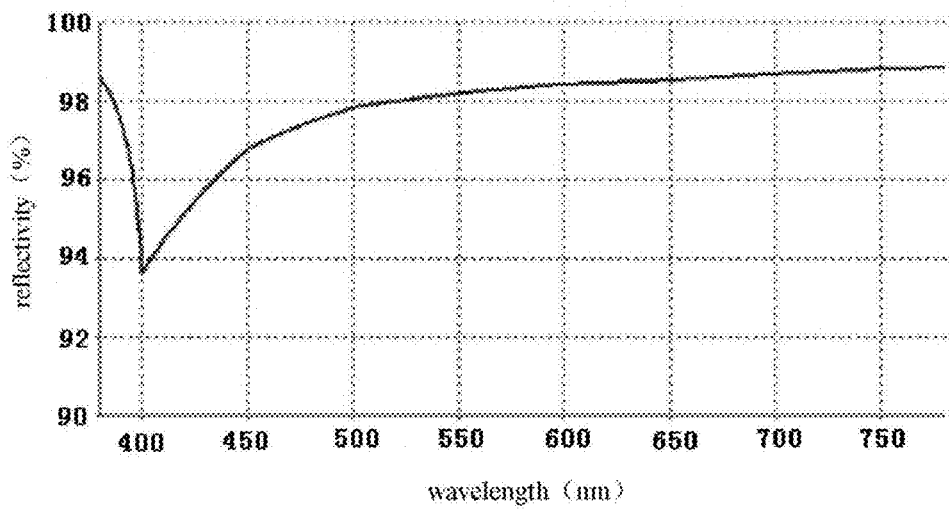
FIG. 4 shows a schematic view for reflectivity of a mono-layered reflective plating film in a comparison backlight module.
Figure 5:
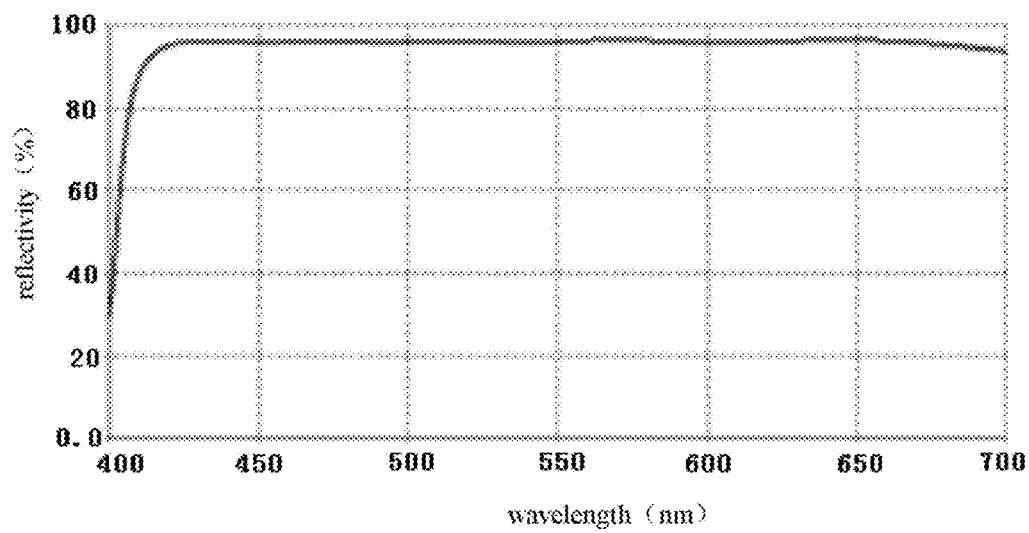
FIG. 5 shows a schematic view for reflectivity of a Bragg reflective plating layer in the backlight module according to an embodiment of the present disclosure.

The reflectivity of the Bragg reflective plating layer in the backlight module obtained from above and the mono-layered reflective plating film in the comparison backlight module is measured, wherein the results are shown respectively in FIG. 4 (the comparison backlight module) and FIG. 5 (the backlight module of the present disclosure). As can be seen from the above results, the reflectivity of the comparison backlight module is very low, and it is not substantially stable until a wavelength of 600 nm. However, for the Bragg reflective plating layer of the present disclosure, the reflectivity rapidly rises up to 98% within a small range of wavelengths after a wavelength of 400 nm, which greatly increases the light extraction, and in the meanwhile promotes the luminance of output light.

Figure 6:
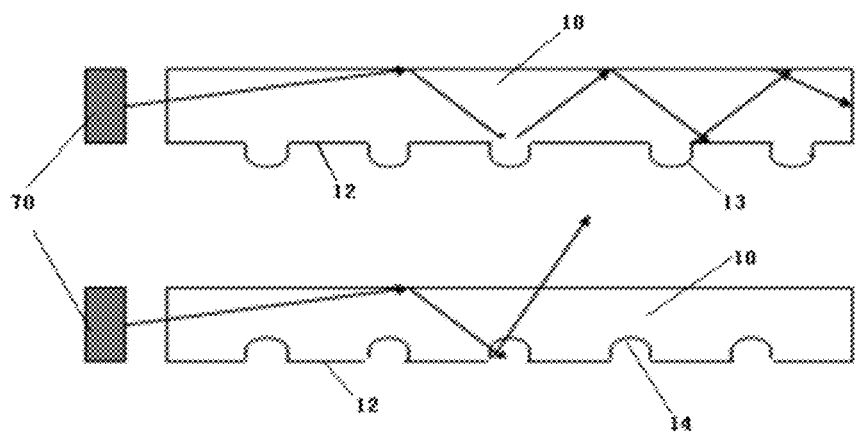
FIG. 6 shows a schematic structure view of a light guide plate according to an embodiment of the present disclosure.

According to an embodiment of the present disclosure, the upper surface 12 of the light guide plate 10 is further provided with convex-dot light guide patterns 13 (the upper drawing in FIG. 6) or concave-dot light guide patterns 14 (the lower drawing in FIG. 6), in order to further improve the performance of the backlight module. Specifically, the convex-dot light guide patterns 13 (the upper drawing in FIG. 6) is converted into the concave-dot light guide patterns 14 (the lower drawing in FIG. 6), so as to ensure further that the total reflection inside the light guide plate is destroyed to a larger degree and that light can be refracted out of the light guide plate 10 (LGP) through the concave-dot light guide patterns 14. In this way, the light extraction is promoted. Experimental data have shown that by using this kind of design, the light extraction can be promoted by about 5%.

Figure 7:
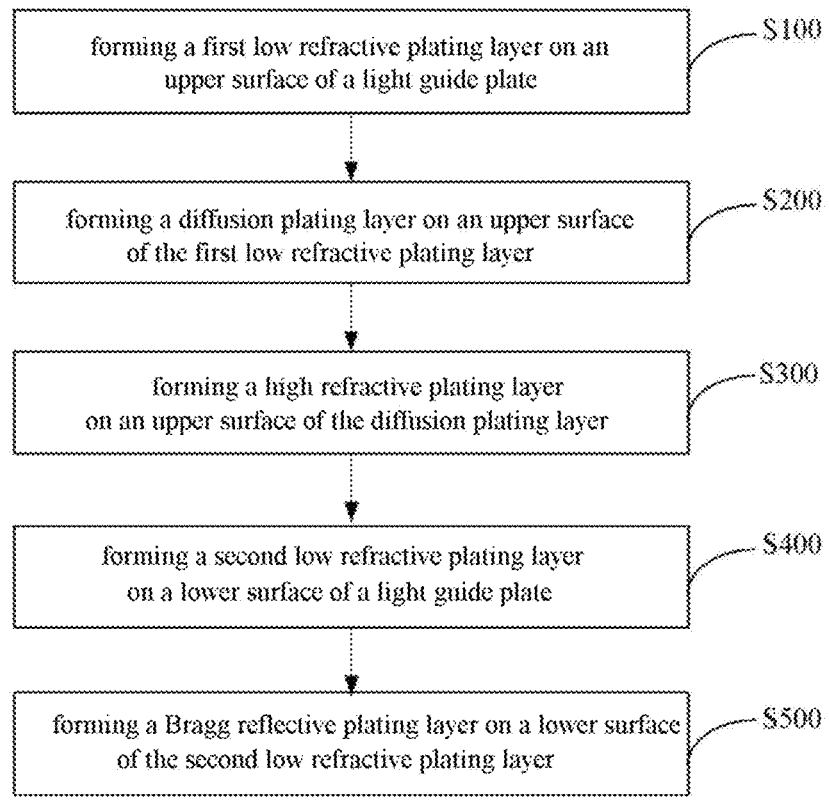
FIG. 7 is a flow chart showing a method for manufacturing a backlight module according to an embodiment of the present disclosure.

According to another aspect of the present disclosure, a method for manufacturing the above backlight module is provided. According to an embodiment of the present disclosure, with reference to FIG. 7, the method can comprise steps as follows.

S100: forming a first low refractive plating layer on an upper surface of a light guide plate.

According to an embodiment of the present disclosure, there are not special limitations on the specific approach for forming the first low refractive layer on the light guide plate. As an example, the first low refractive layer can be formed by chemical vapor deposition, physical vapor deposition or coating. In some specific examples of the present disclosure, the first low refractive plating layer can be formed on a surface of the light guide plate by evaporating a fluoride. The first low refractive plating layer can replace an air layer between a conventional light guide plate and a diffusion sheet. Besides, a plating layer formed by evaporation has a notably reduced thickness. Also, the evaporation process is very mature, which facilitates automatic mass production.

S200: forming a diffusion plating layer on an upper surface of the first low refractive plating layer.

According to an embodiment of the present disclosure, the approach for forming the diffusion layer can comprise one of chemical vapor deposition, physical vapor deposition or coating, for example, comprising but not limited to evaporation, sputtering or coating. In some specific examples of the present disclosure, the diffusion layer can be formed by organic coating. Therefore, the manufacturing process is simple and easy to control, and the cost is relative low.

S300: forming a high refractive plating layer on an upper surface of the diffusion plating layer.

According to an embodiment of the present disclosure, the high refractive plating layer can be formed by one of chemical vapor deposition, physical vapor deposition or coating. In some embodiments of the present disclosure, the high refractive plating layer can be formed by evaporation. In some embodiments, a high refractive layer consisting of a plurality of high refractive sub-layers can be formed by multiple evaporations. The high refractive layer formed in this manner has an ultra-thin thickness, which facilitates realization of a thin and lightweight backlight module. Besides, the high refractive layer can converge light towards a light exit direction perpendicular to the panel, and the maximum light intensity is located in such a light exit direction.

S400: forming a second low refractive plating layer on a lower surface of a light guide plate.

According to an embodiment of the present disclosure, the approach for forming the second low refractive plating layer is the same as that for forming the first low refractive plating layer. Specifically, it can be formed by chemical vapor deposition, physical vapor deposition or coating. Optionally, the second low refractive plating layer is formed by evaporating a fluoride. The second low refractive plating layer can effectively substitute the air layer located on a bottom side of the light guide plate in a conventional backlight module. This helps to reduce the thickness of the backlight module greatly and to simplify the structure thereof.

S500: forming a Bragg reflective plating layer on a lower surface of the second low refractive plating layer.

According to an embodiment of the present disclosure, there are no special limitations on the approach for forming the Bragg reflective plating layer, and it can be formed by using a known forming approach for plating layers in the art. For example, it can be formed by chemical vapor deposition, physical vapor deposition or coating. In a specific example of the present disclosure, the Bragg reflective plating layer is formed by evaporating silicon dioxide and titanium dioxide alternately. In this way, the Bragg reflective layer can be formed by simple and rapid operations. Besides, the Bragg reflective layer formed in this way has a better reflective effect, and can achieve a reflectivity of up to 98%.

The inventors have found that the backlight module as mentioned above can be manufactured rapidly and effectively by this method. Moreover, the manufacturing steps are simple, the operations are convenient and rapid, and the resulting backlight module is ultra-thin. Thus, a good display effect can be achieved.

According to another aspect of the present disclosure, a display panel is further provided. According to an embodiment of the present disclosure, the display panel comprises the backlight module as mentioned above. It is found that the thickness of the display panel is greatly reduced. In particular, the backlight module boasts simple structure, high light utilization, low light loss and high luminance. Thereby, the image quality and the product yield of the display panel are both improved notably.

Figure 8:
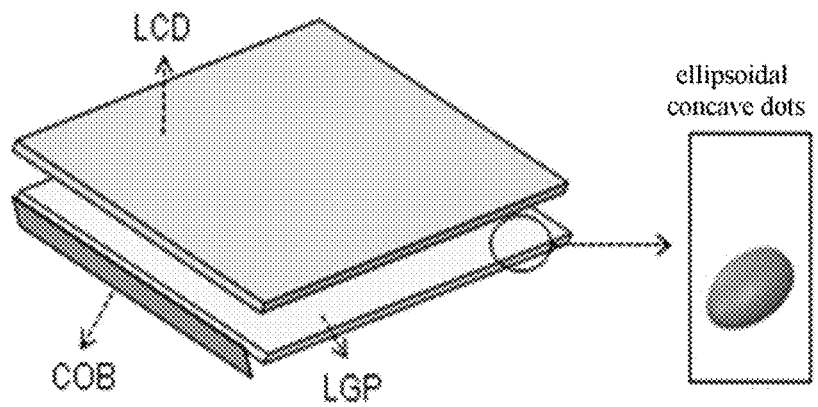
FIG. 8 shows a schematic structure view of a display panel according to an embodiment of the present disclosure.

One skilled in the art can understand that, apart from the backlight module as mentioned above, the display panel of the present disclosure further comprises other essential components, e.g., a liquid crystal display module. In some embodiments of the present disclosure, with reference to FIG. 8, the display panel comprises a backlight module 100 and a liquid crystal display module (LCD) 200, wherein the liquid crystal display module is arranged above the backlight module. Specifically, the backlight module 100 comprises a light guide plate (LGP) provided with ellipsoidal concave dots, a chip on board (COB) light bar, and a plurality of plating layers located above or below respective sides of the light guide plate. In the present disclosure, since the optical films of a conventional backlight module are replaced by a plurality of plating layers, the backlight module can be ultra-thin. Thereby, a thin and lightweight display panel is achieved. Besides, the backlight module boasts low light loss, high light utilization and high luminance. Thus, the display effect of the display panel is improved notably.

According to yet another aspect of the present disclosure, an electronic device is further provided. According to an embodiment of the present disclosure, the electronic device comprises the display panel as mentioned above. Due to the display panel as mentioned above, the electronic device has a thin thickness, which facilitates the development trend toward thinness and light weight and achieves a good image display quality. One skilled in the art can understand that the electronic device has all features and advantages of the display panel as mentioned above, which will not be repeated herein for simplicity.

One skilled in the art can understand that, apart from the display panel as mentioned above, the electronic device of the present disclosure further comprises other essential components necessary for a conventional electronic device. To take a cellphone as an example, it can further comprises external structures such as an input part (a keyboard, a touch panel), a sound playing part (a ring, a handset), a sound receiving part (a microphone), a power supply part (a battery), a camera, and an accessory part (a charger, a data line, an earphone, etc.); as well as internal structures such as a mainboard (a circuit board welded with various components), a CPU, a power source (for distributing battery energy and electrical power to each component), a radio frequency (for transceiving and decoding signals), and components for performing auxiliary functions such as a camera module, a Bluetooth module and a GPS module.

According to an embodiment of the present disclosure, there are no special limitations on the specific types of electronic device, which can be any electronic device having a display function in this art, for example, comprising but not limited to a cellphone, a tablet computer, a game console, a television and a large-screen display device.

Although embodiments of the present disclosure have been shown and described, it can be understood that these embodiments are exemplary, and cannot be construed as limiting the present disclosure. One having ordinary skills in the art can vary, change, substitute and modify the above embodiments within the scope of the present disclosure.

The invention claimed is:

1. A backlight module, comprising:
   a light guide plate, comprising a first surface and a second surface opposite to each other,
   a first low refractive plating layer, arranged on the first surface of the light guide plate,
   a diffusion plating layer, arranged on a surface of the first low refractive plating layer away from the light guide plate,
   a high refractive plating layer, arranged on a surface of the diffusion plating layer away from the light guide plate,
   a Bragg reflective plating layer, arranged on the second surface of the light guide plate, and
   a light source, arranged at a light incident side of the light guide plate, wherein
   a refractive index of the first low refractive plating layer is lower than that of the light guide plate, and
   a refractive index of the high refractive plating layer is higher than that of the light guide plate.

2. The backlight module according to claim 1, further comprising:
   a second low refractive plating layer, arranged between the light guide plate and the Bragg reflective plating layer, wherein
   a refractive index of the second low refractive plating layer is lower than that of the light guide plate.

3. The backlight module according to claim 2, wherein the first low refractive plating layer and the second low refractive plating layer are formed of a fluoride respectively, wherein the fluoride comprises at least one of calcium fluoride and magnesium fluoride.

4. The backlight module according to claim 1, wherein the diffusion plating layer comprises diffusion particles, wherein the diffusion particles comprise at least one of acrylic acid and organic silicon.

5. The backlight module according to claim 1, wherein the high refractive plating layer further comprises: a plurality of high refractive sub-plating layers, wherein refractive indexes of the plurality of high refractive sub-plating layers increase gradually in a direction away from the light guide plate.

6. The backlight module according to claim 5, wherein none of the refractive indexes of the plurality of high refractive sub-plating layers is lower than 1.56.

7. The backlight module according to claim 6, wherein the plurality of high refractive sub-plating layers are formed of an optical glue respectively.

8. The backlight module according to claim 1, wherein the Bragg reflective plating layer comprises silicon dioxide layers and titanium dioxide layers stacked alternately.

9. The backlight module according to claim 1, wherein the first surface of the light guide plate is provided with concave-dot light guide patterns.

10. A display panel, comprising the backlight module according to 1.

11. An electronic device, comprising the display panel according to claim 10.

12. The display panel according to claim 10, wherein the backlight module further comprises:
    a second low refractive plating layer, arranged between the light guide plate and the Bragg reflective plating layer, wherein
    a refractive index of the second low refractive plating layer is lower than that of the light guide plate.

13. The display panel according to claim 12, wherein the first low refractive plating layer and the second low refractive plating layer are formed of a fluoride respectively, wherein the fluoride comprises at least one of calcium fluoride and magnesium fluoride.

14. The display panel according to claim 10, wherein the diffusion plating layer comprises diffusion particles, wherein the diffusion particles comprise at least one of acrylic acid and organic silicon.

15. The display panel according to claim 10, wherein the high refractive plating layer further comprises: a plurality of high refractive sub-plating layers, wherein refractive indexes of the plurality of high refractive sub-plating layers increase gradually in a direction away from the light guide plate.

16. The display panel according to claim 15, wherein none of the refractive indexes of the plurality of high refractive sub-plating layers is lower than 1.56.

17. The display panel according to claim 16, wherein the plurality of high refractive sub-plating layers are formed of an optical glue respectively.

18. The display panel according to claim 10, wherein the Bragg reflective plating layer comprises silicon dioxide layers and titanium dioxide layers stacked alternately.

19. The display panel according to claim 10, wherein the first surface of the light guide plate is provided with concave-dot light guide patterns.

* * * * *